(12) United States Patent
Sheridon et al.

(10) Patent No.: US 6,497,942 B2
(45) Date of Patent: Dec. 24, 2002

(54) TWISTING-CYLINDER DISPLAY

(75) Inventors: Nicholas K. Sheridon, Los Altos, CA (US); Joseph M. Crowley, Morgan Hill, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/970,070

(22) Filed: Oct. 2, 2001

(65) Prior Publication Data

US 2002/0015831 A1 Feb. 7, 2002

Related U.S. Application Data

(60) Division of application No. 08/960,865, filed on Oct. 30, 1997, now Pat. No. 6,428,868, which is a continuation-in-part of application No. 08/716,672, filed on Sep. 13, 1996, now Pat. No. 6,055,091.
(60) Provisional application No. 60/020,651, filed on Jun. 27, 1996.

(51) Int. Cl.[7] ............................................. B32B 27/14
(52) U.S. Cl. .................... 428/195; 428/40.2; 428/38; 345/107; 345/108; 359/296
(58) Field of Search ..................... 428/40.2, 38, 195; 359/296, 298, 299, 316, 290; 345/107, 108

*Primary Examiner*—Merrick Dixon
(74) *Attorney, Agent, or Firm*—Nola Mae McBain

(57) ABSTRACT

A gyricon or twisting-particle display based on nonspheroidal (e.g., substantially cylindrical) optically anisotropic particles disposed in a substrate. The particles can be either bichromal or polychromal cylinders, preferably aligned parallel to one another and packed close together in a monolayer. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. The close-packed monolayer configuration of particles provides excellent brightness characteristics and relative ease of manufacture as compared with certain other high-brightness gyricon displays. The substrate containing the cylinders can be fabricated with the swelled-elastomer techniques known from spherical-particle gyricon displays, with a simple agitation process step being used to align the cylinders within the sheeting material. Techniques for fabricating the cylinders are also disclosed.

10 Claims, 16 Drawing Sheets

TWISTING-CYLINDER DISPLAY

RELATED APPLICATIONS AND PRIORITY

This application is a divisional of Application(s) Ser. No(s). 08/960,865, U.S. Pat. No. 6,428,868 filed Oct. 30, 1997 which is a continuation in part of Ser. No. 08/716,672 U.S. Pat. No. 6,055,091 filed Sep. 13, 1996 which claimed priority from U.S. Provisional Application No. 60/020,651 filed Jun. 27, 1996.

This application is a continuation in part of and therefore entitled to the filing date of copending U.S. patent application Ser. No. 08/716,672 titled "Twisting Cylinder Display" filed Sep. 13, 1996 which claimed priority from the following U.S. provisional applications having the same assignee and at least one common inventor: No. 60/020,651, filed Jun. 27, 1996; and No. 60/020,522, also filed Jun. 27, 1996.

INCORPORATION BY REFERENCE

The following U.S. patents are fully incorporated herein by reference: U.S. Pat. No. 4,126,854, (Sheridon, "TWISTING BALL PANEL DISPLAY"); U.S. Pat. No. 4,143,103 (Sheridon, "METHOD OF MAKING A TWISTING BALL PANEL DISPLAY"); U.S. Pat. No. 5,262,098 (Crowley et al., "METHOD AND APPARATUS FOR FABRICATING BICHROMAL BALLS FOR A TWISTING BALL DISPLAY"); U.S. Pat. No. 5,344,594 (Sheridon, "METHOD FOR THE FABRICATION OF MULTICOLORED BALLS FOR A TWISTING BALL DISPLAY"); and U.S. Pat. No. 5,389,945 (Sheridon, "WRITING SYSTEM INCLUDING PAPER-LIKE DIGITALLY ADDRESSED MEDIA AND ADDRESSING DEVICE THEREFOR"), U.S. patent application Ser. No. 08/572,779 entitled "POLYCHROMAL SEGMENTED BALLS FOR A TWISTING BALL DISPLAY"; U.S. patent application Ser. No. 08/572,778, entitled "APPLICATIONS OF A TRANSMISSIVE TWISTING BALL DISPLAY"; U.S. patent application Ser. No. 08/572,819, entitled "CANTED ELECTRIC FIELDS FOR ADDRESSING A TWISTING BALL DISPLAY"; U.S. patent application Ser. No. 08/572,927, entitled "HIGHLIGHT COLOR TWISTING BALL DISPLAY"; U.S. patent application Ser. No. 08/572,912, entitled "PSEUDO-FOUR COLOR TWISTING BALL DISPLAY"; U.S. patent application Ser. No. 08/572,820, entitled "ADDITIVE COLOR TRANSMISSIVE TWISTING BALL DISPLAY"; U.S. patent application Ser. No. 08/572,780, entitled "SUBTRACTIVE COLOR TWISTING BALL DISPLAY"; U.S. patent application Ser. No. 08/572,775, entitled "MULTITHRESHOLD ADDRESSING OF A TWISTING BALL DISPLAY"; U.S. patent application Ser. No. 08/572,777, entitled "FABRICATION OF A TWISTING BALL DISPLAY HAVING TWO OR MORE DIFFERENT KINDS OF BALLS"; and U.S. patent application Ser. No. 08/573,922, entitled "ADDITIVE COLOR TRISTATE LIGHT VALVE TWISTING BALL DISPLAY." All filed concurrently on Dec. 15$^{th}$, 1995, and two divisional applications from U.S. patent application Ser. No. 08/572,779, entitled "POLYCHROMAL SEGMENTED BALLS FOR A TWISTING BALL DISPLAY", "POLYCHROMAL SEGMENTED BALLS FOR A TWISTING BALL DISPLAY" now U.S. Pat. No. 5,919,409, U.S. patent application Ser. No. 08/889,762, entitled "APPARATUS FOR FABRICATING POLYCHROMAL SEGMENTED BALLS FOR A TWISTING BALL DISPLAY" filed on Jul. 10$^{th}$, 1997.

RELATED PATENT APPLICATIONS

The following copending, coassigned U.S. Patent Applications are related to this case: U.S. patent application Ser. No. 08/713935, entitled "MONOLAYER GYRICON DISPLAY"; U.S. patent application Ser. No. 08713,936, entitled "HIGH REFLECTANCE GYRICON DISPLAY"; U.S. patent application Ser. No. 081716,675,entitled "GYRICON DISPLAY WITH INTERSTITIALLY PACKED PARTICLE ARRAYS"; and U.S. patent application Ser. No. 08/713,325, entitled "GYRICON DISPLAY WITH NO ELASTOMER SUBSTRATE."

BACKGROUND OF THE INVENTION

The invention pertains to visual displays and more particularly to twisting-ball displays, such as gyricon displays and the like.

Gyricon displays, also known by other names such as electrical twisting-ball displays or rotary ball displays, were first developed over twenty years ago. See U.S. Pat. Nos. 4,126,854 and 4,143,103, incorporated by reference hereinabove.

An exemplary gyricon display 10 is shown in side view in FIG. 1A (PRIOR ART). Bichromal balls 1 are disposed in an elastomer substrate 2 that is swelled by a dielectric fluid creating cavities 3 in which the balls 1 are free to rotate. The balls 1 are electrically dipolar in the presence of the fluid and so are subject to rotation upon application of an electric field, as by matrix-addressable electrodes 4a, 4b. The electrode 4a closest to upper surface 5 is preferably transparent. An observer at I sees an image formed by the black and white pattern of the balls 1 as rotated to expose their black or white faces (hemispheres) to the upper surface 5 of substrate 2.

A single one of bichromal balls 1, with black and white hemispheres 1a and 1b, is shown in FIG. 1B (PRIOR ART).

Gyricon displays have numerous advantages over conventional electrically addressable visual displays, such as LCD and CRT displays. In particular, they are suitable for viewing in ambient light, retain an image indefinitely in the absence of an applied electric field, and can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reuseable (and thus environmentally friendly) substitute for ordinary paper. For further advantages of the gyricon, see U.S. Pat. No. 5,389,945, incorporated by reference hereinabove.

Known gyricon displays employ spherical particles (e.g., bichromal balls) as their fundamental display elements. There are good reasons for using spherical particles. In particular:

Spherical bichromal balls can be readily manufactured by a number of techniques. See the '098 and '594 patents, incorporated by reference hereinabove, in this regard.

Spheres are symmetrical in three dimensions. This means that fabrication of a gyricon display sheet from spherical particles is straightforward. It is only necessary to disperse the balls throughout an elastomer substrate, which is then swelled with dielectric fluid to form spherical cavities around the balls. The spherical balls can be placed anywhere within the substrate, and at any orientation with respect to each other and with respect to the substrate surface. There is no need to align the balls with one another or with the substrate surface. Once in place, a ball is free to rotate about any axis within its cavity.

"In the 'white' state, the gyricon display reflects almost entirely from the topmost layer of bichromal balls and, more particularly, from the white hemispherical upper surfaces of the topmost layer of balls. In a preferred embodiment, the inventive display is constructed with a single close-packed monolayer of bichromal balls."

Ideally, a close-packing arrangement would entirely cover the plane with the monolayer of gyricon elements. However,. Inasmuch as a planar array of spheres cannot fully cover the plane, but must necessarily contain interstices, the best that can be achieved with a single population of uniform-diameter spherical elements is about 90.7 percent areal coverage, which is obtained with a hexagonal packing geometry. A second population of smaller balls can be added to fill in the gaps somewhat, but this complicates display fabrication and results in a tradeoff between light losses due to unfilled interstices and light losses due to absorption by the black hemispheres of the smaller interstitial balls.

Therefore, it would be desirable to provide a close-packed monolayer gyricon display in which areal coverage surpasses 90.7 percent or approaches 100 percent, without any need for interstitial particles. This can be done by using cylindrical rather than spherical elements. For example, a rectangular planar monolayer array of cylinders can be constructed that entirely or almost entirely covers the plane. With the white faces of the cylinders exposed to an observer, little if any light can get through the layer.

SUMMARY OF THE INVENTION

The invention provides a gyricon display having cylindrical, rather than spherical, rotating elements. The elements can be bichromal or polychromal cylinders, preferably aligned parallel to one another and packed close together in a monolayer. The close-packed monolayer configuration provides excellent brightness characteristics and relative ease of manufacture as compared with certain other high-brightness gyricon displays. The cylinders can be fabricated by techniques that will be disclosed. The substrate containing the cylinders can be fabricated with the swelled-elastomer techniques known from spherical-particle gyricon displays, with a simple agitation process step being used to align the cylinders within the sheeting material.

Further, the invention is well-suited to providing a gyricon display having superior reflectance characteristics comparing favorably with those of white paper. A gyricon display is made with a close-packed monolayer of cylinders, wherein cylinders are placed, preferably in a rectangular packing arrangement, so that the surfaces of adjacent cylinders are as close to one another as possible. The light reflected from the inventive gyricon display is reflected substantially entirely from the monolayer of cylinders, so that lower layers are not needed. The areal coverage fraction obtainable with cylinders is greater than that obtainable with a single monolayer of uniform-diameter spheres.

In one aspect, the invention provides a material comprising a substrate and a plurality of nonspheroidal (e.g., substantially cylindrical) optically anisotropic particles disposed in the substrate. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. A display apparatus can be constructed from a piece of the material together with means (such as an electrode assembly) for facilitating a rotation of at least one particle rotatably disposed in the substrate of the piece of material.

In another aspect, the invention provides a material comprising a substrate having a surface and a plurality of nonspheroidal optically anisotropic particles disposed in the substrate substantially in a single layer. The particles (e.g., cylinders) are of a substantially uniform size characterized by a linear dimension d (e.g., diameter). Each particle has a center point, and each pair of nearest neighboring particles in the layer is characterized by an average distance D therebetween, the distance D being measured between particle center points. A rotatable disposition of each particle is achievable while the particle is thus disposed in the substrate. A particle, when in its rotatable disposition, is not attached to the substrate. Particles are sufficiently closely packed with respect to one another in the layer such that the ratio of the union of the projected areas of the particles to the area of the substrate surface exceeds the areal coverage fraction that would be obtained from a comparably situated layer of spheres of diameter d disposed in a hexagonal packing arrangement with an average distance D therebetween as measured between sphere centers. If the ratio D/d is made as close to 1.0 as practicable, the ratio of the union of the projected areas of the particles to the area of the substrate surface can be made to exceed the maximum theoretically possible areal coverage fraction for a maximally close-packed hexagonal packing geometry of a layer of spheres of diameter d, which is approximately equal to 90.7 percent.

The invention will be better understood with reference to the following description and accompanying drawings, in which like reference numerals denote like elements.

DETAILED DESCRIPTION

In a preferred embodiment of the invention, bichromal cylinders are arranged in a close-packed planar monolayer, as close to one another as possible, so as to cover the plane of the monolayer. The advantages of a close-packed monolayer display are discussed at length in copending, coassigned U.S. patent application Ser. No. 08/713,935, entitled "Monolayer Gyricon Displays"suffice it to say here that close-packed monolayer displays exhibit superior reflectance and brightness characteristics as compared with conventional gyricon displays, and that the more of the monolayer plane that is covered by the gyricon elements, the better the reflectance and the brighter the display.

To quote briefly from Ser. No. 08/713,935: "in the 'white' state, the inventive display reflects entirely from the topmost layer of bichromal balls and, more particularly, from the white hemispherical upper surfaces of the topmost layer of balls. In a preferred embodiment, the inventive display-is constructed with a single close-packed monolayer of bichromal balls."

Ideally, a close-packing arrangement according to Ser. No. 08/713,935 would entirely cover the plane with the monolayer of gyricon elements. However, the displays disclosed in Ser. No. 08/713,935 are all based on spherical balls of the prior art. In as much as a planar array of spheres cannot fully cover the plane, but must necessarily contain interstices, the best that can be achieved with a single population of uniform-diameter spherical elements is about 90.7 percent areal coverage, which is obtained with a hexagonal packing geometry. A second population of smaller balls can be added to fill in the gaps somewhat, but this complicates display fabrication and results in a tradeoff between light losses due to unfilled interstices and light losses due to absorption by the black hemispheres of the smaller interstitial balls.

The present invention provides a close-packed monolayer gyricon display in which areal coverage can approach 100 percent, without any need for interstitial particles. It does so by using cylindrical rather than spherical bichromal elements. For example, a rectangular planar monolayer array of cylinders can be constructed that entirely or almost entirely covers the plane. With the white faces of the cylinders exposed to an observer, little if any light can get through the layer.

Figure 1A:
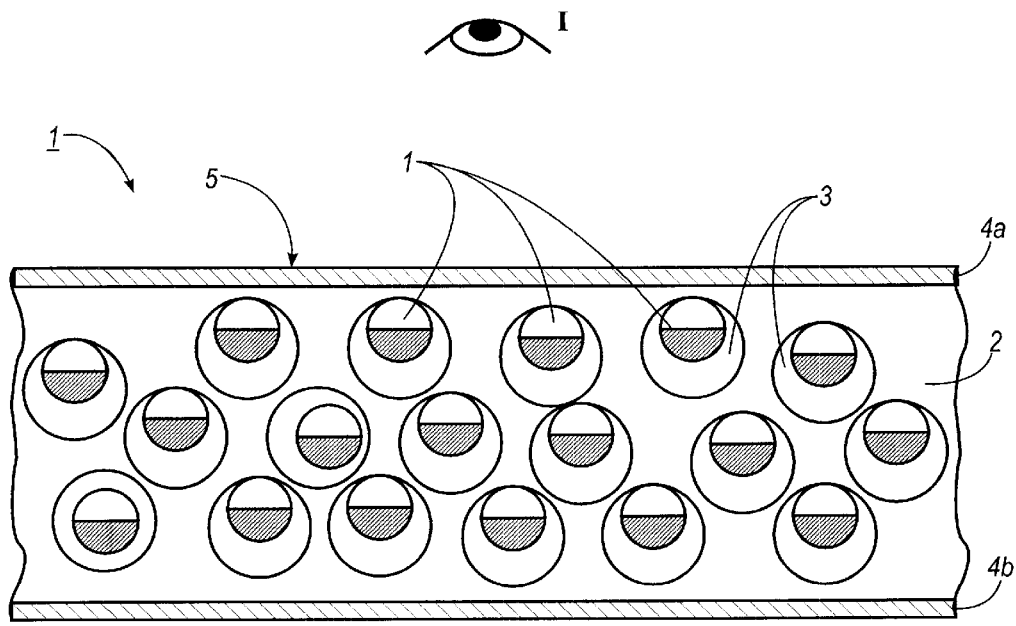
FIG. 1A is an exemplary gyricon display of the PRIOR ART, incorporating bichromal balls.
Figure 1B:
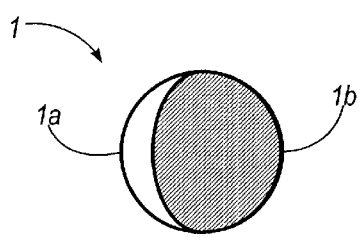
FIG. 1B illustrates a spherical bichromal ball of the PRIOR ART.
Figure 2:
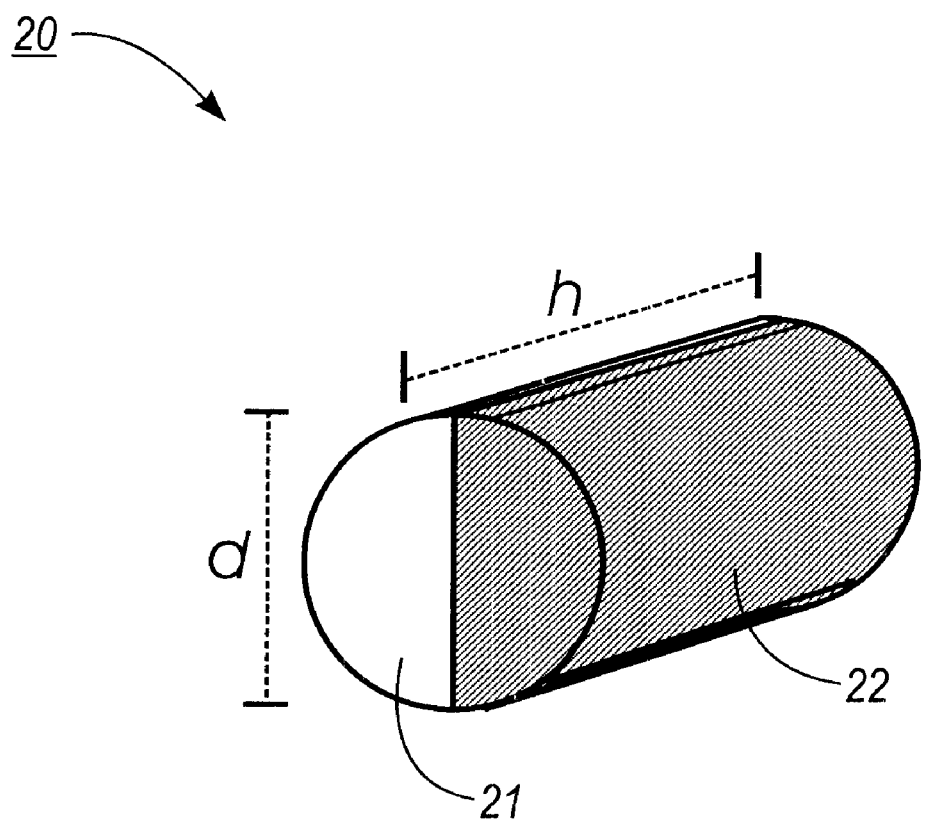
FIG. 2 illustrates a bichromal cylinder, showing in particular the diameter and height thereof.

FIG. 2 illustrates a bichromal cylinder 20 suitable for use as a rotating element of the inventive gyricon display. Cylinder 20 has white face 21 and black face 22. Cylinder 20 is of height (or length) h and has diameter d. The aspect ratio of cylinder 20 is defined herein as the ratio h/d. In the presence of a dielectric fluid, cylinder 20 is electrically dipolar, with the dipole moment preferably oriented perpendicular to the plane separating the white and black portions of the cylinder and passing perpendicularly through the longitudinal axis of the cylinder.

Figure 3:
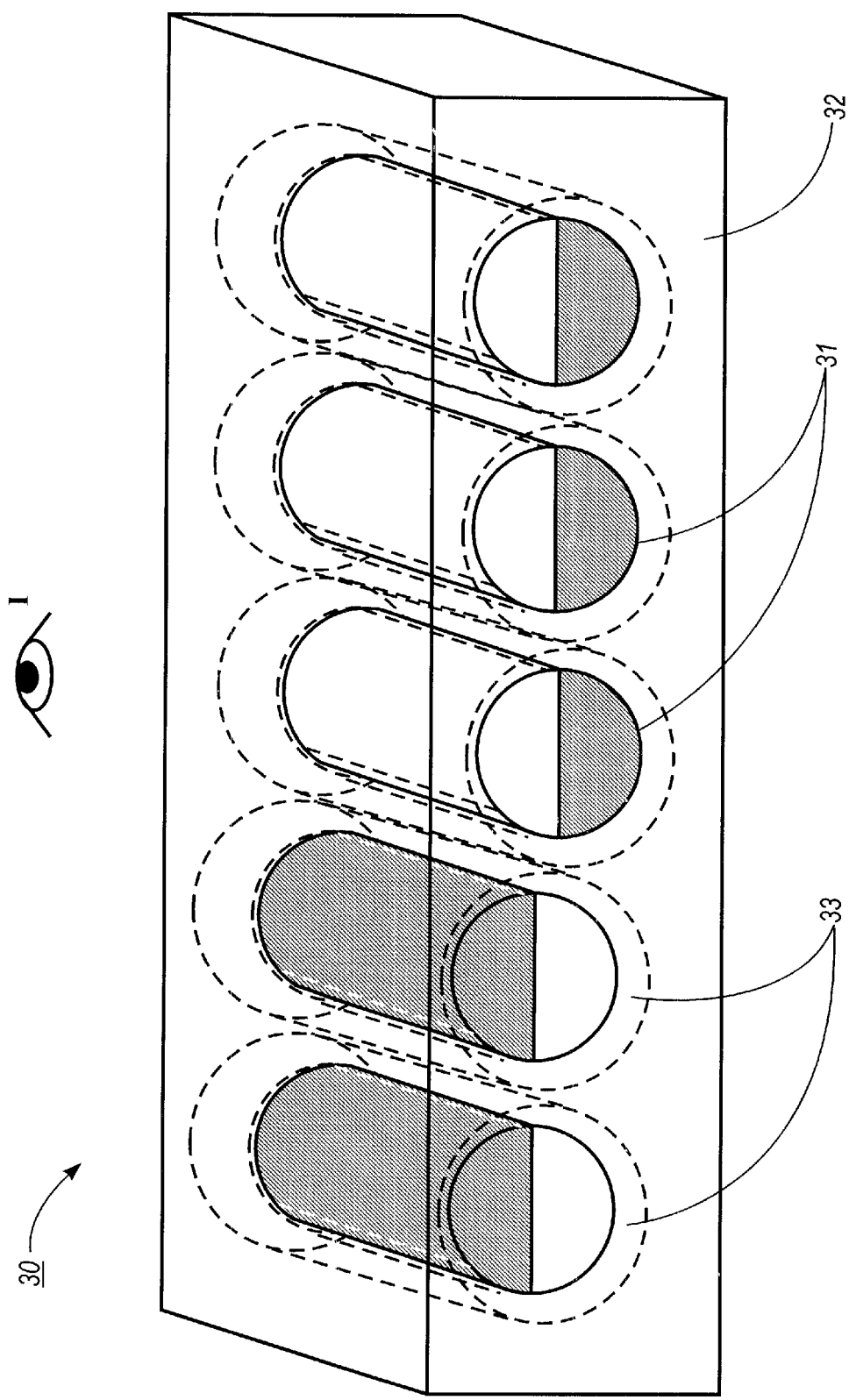
FIG. 3 illustrates bichromal cylinders in cavities in an elastomer substrate.

FIG. 3 illustrates how bichromal cylinders can be arranged in an elastomer substrate for use in the inventive display. A portion of a gyricon display 30 is shown. In display 30, bichromal cylinders 31 are disposed in an elastomer substrate 32 that is swelled by a dielectric fluid (not shown) creating cavities 33 in which the cylinders 31 are free to rotate about their respective longitudinal axes. Cavities 33 are preferably not much larger in diameter than cylinders 31, so that cylinders 31 are constrained from rotating about their medial axes. Cylinders 31 are electrically dipolar in the presence of the dielectric fluid, and so are subject to rotation upon application of an electric field. As shown, cylinders 31 can be rotated so as to expose either their white or black faces to an observer at I.

Figure 4:
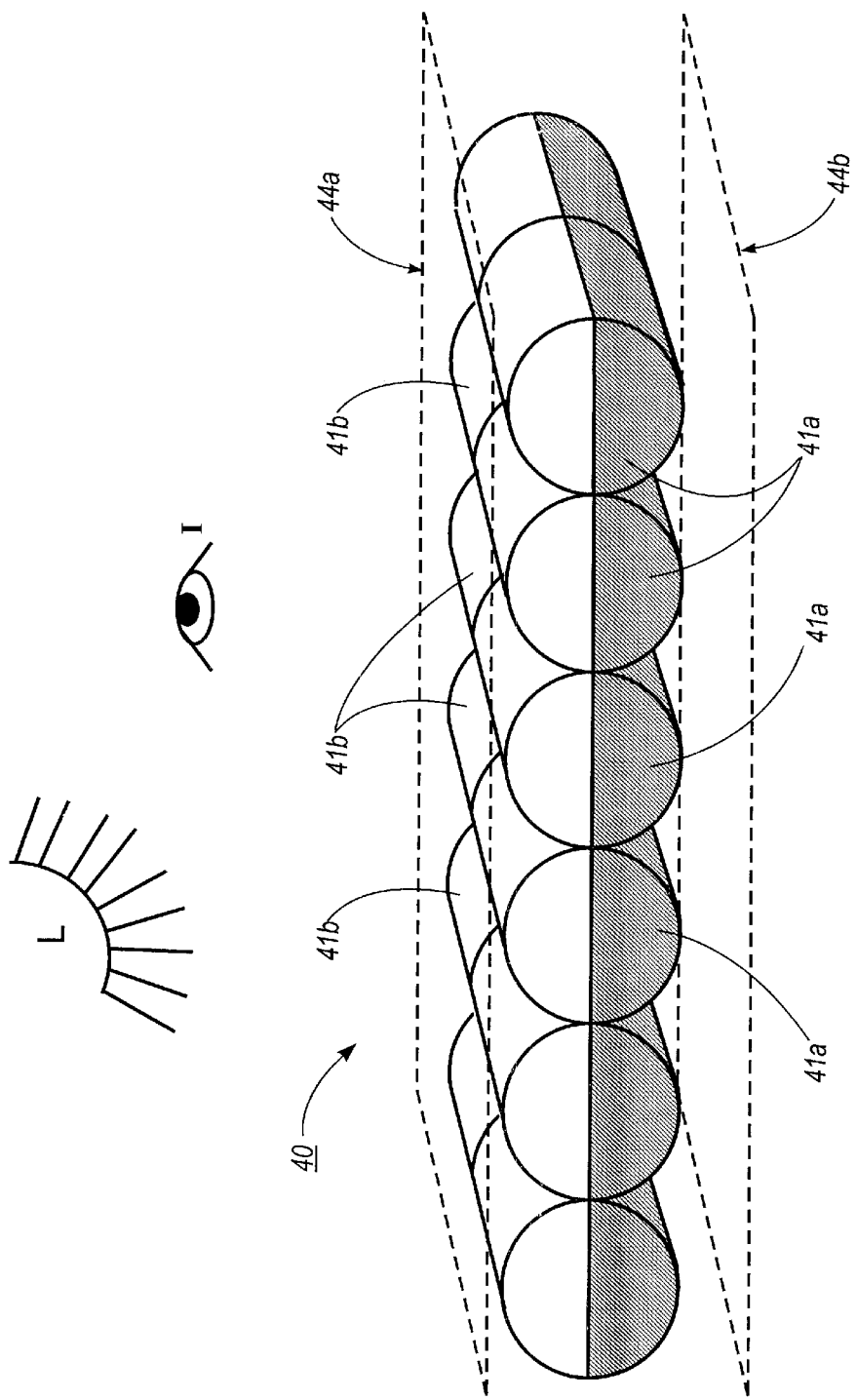
FIG. 4 illustrates bichromal cylinders arrayed in an ideal close-packed monolayer.

FIG. 4 illustrates bichromal cylinders arrayed in a close-packed monolayer. A portion of a gyricon display 40 includes rows of bichromal cylinders 41a and 41b of uniform diameter. Cylinders 41a, 41b are disposed in a monolayer between the upper and lower surfaces 44a, 44b of display 40. Preferably there is exactly one cylinder between any given point on upper surface 44a and the corresponding point directly beneath it on lower surface 44b.

The white faces of cylinders 41a, 41b are shown turned towards transparent viewing surface 44a. In this configuration, light from a light source L incident on upper surface 44a is scattered by the white faces of cylinders 41a, 41b and is reflected so as to be visible to an observer at I. Thus display 40 appears white to the observer.

As shown, the cylinders are aligned end-to-end within the monolayer, the circular ends of cylinders 41a being aligned with the circular ends of cylinders 41b so that the longitudinal axis of each cylinder 41a is colinear with the longitudinal axis of its respective neigboring cylinder 41b. Further as shown, the cylinders are aligned side-to-side within the monolayer, so that the circumferences of neighboring cylinders 41a touch each other, and the circumferences of neighboring cylinders 41b likewise touch each other. Thus aligned end-to-end and side-to-side, the cylinders form a rectangular array, whose structure is observable from above (as by an observer at I) through surface 44a.

Preferably, there are no gaps between adjacent cylinders in the rectangular array. That is, the cylinders 41a, 41b touch each other end-to-end and side-to-side, or come as close as possible to touching each other as is consistent with proper cylinder rotation. Accordingly, there is preferably little or no opportunity for incident light from source L to be scattered from the white faces of the cylinders down to the black faces, where it would be absorbed. Likewise, there is little or no opportunity for incident light to pass between adjacent cylinders, where it would be absorbed in or below lower surface 44b.

Figure 5A:
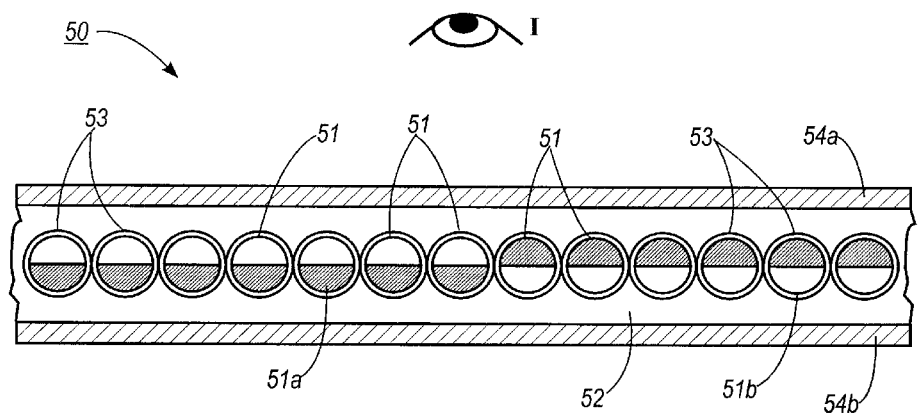
FIGS. 5A–5B are, respectively, side and top views of a gyricon display of the present invention in an embodiment wherein bichromal cylinders of unit (1:1) aspect ratio are arrayed in a monolayer configuration.
Figure 5B:
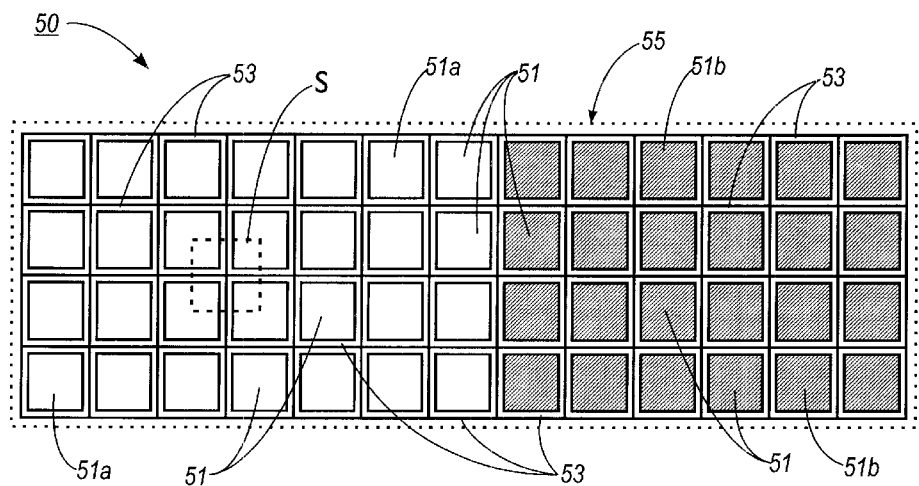

FIGS. 3–4 depict their respective gyricon displays in simplified form, with details not pertinent to the discussion omitted for clarity. FIGS. 5A and 5B provide, respectively, more detailed side and top views of a gyricon display 50 of the invention in a specific embodiment.

In display 50, bichromal cylinders 51 of unit (that is, 1:1) aspect ratio are arrayed in a monolayer array having a rectangular packing geometry. Preferably, bichromal cylinders 51 are placed as close to one another as possible in the monolayer. Cylinders 51 are situated in elastomer substrate 52, which is swelled by a dielectric fluid (not shown) creating cavities 53 in which the cylinders 51 are free to rotate. The cavities 53 are made as small as possible with respect to cylinders 51, so that the cylinders nearly fill the cavities. Also, cavities 53 are placed as close to one another as possible, so that the cavity walls are as thin as possible. Preferably, cylinders 51 are of uniform diameter and situated at a uniform distance from upper surface 55. It will be appreciated that the arrangement of cylinders 51 and cavities 53 in display 50 minimizes both the center-to-center spacing and the surface-to-surface spacing between neighboring bichromal cylinders.

Cylinders 51 are electrically dipolar in the presence of the dielectric fluid and so are subject to rotation upon application of an electric field, as by matrix-addressable electrodes 54a, 54b. The electrode 54a closest to upper surface 55 is preferably transparent. An observer at I sees an image formed by the black and white pattern of the cylinders 51 as rotated to expose their black or white faces to the upper surface 55 of substrate 52. For example, the observer sees the white faces of cylinders such as cylinder 51a and the black faces of cylinders such as cylinder 51b.

The side view FIG. 5A reveals the monolayer construction of display 50. The top view of FIG. 5B illustrates the rectangular packing geometry of cylinders 51 in the monolayer. The cylinders 51 appear as squares visible through transparent upper surface 55. The centers of cylinders 51 form a square pattern, as shown by exemplary square S.

The projected areas of cylinders 51 in the plane of surface 55 preferably cover as much of the total area of the plane of surface 55 as possible. To this end, cavities 53 preferably are made as small as possible, ideally no larger than the cylinders themselves (or as close to this ideal as is consistent with proper cylinder rotation). The greater the ratio between the sum of the projected areas of the cylinders in the plane of viewing surface 55 and the total area of viewing surface 55, the greater the display reflectance and the brighter the display. It will be appreciated that, whereas the maximum areal coverage theoretically possible with spherical bichromal balls (of a single uniform diameter, without interstitial smaller balls) is about 90.7 percent, the maximum for bichromal cylinders is 100 percent. Thus a gyricon display made from a close-packed monolayer of cylinders according to the invention can be made brighter than a gyricon display made from a close-packed monolayer of spherical balls.

Figure 6:
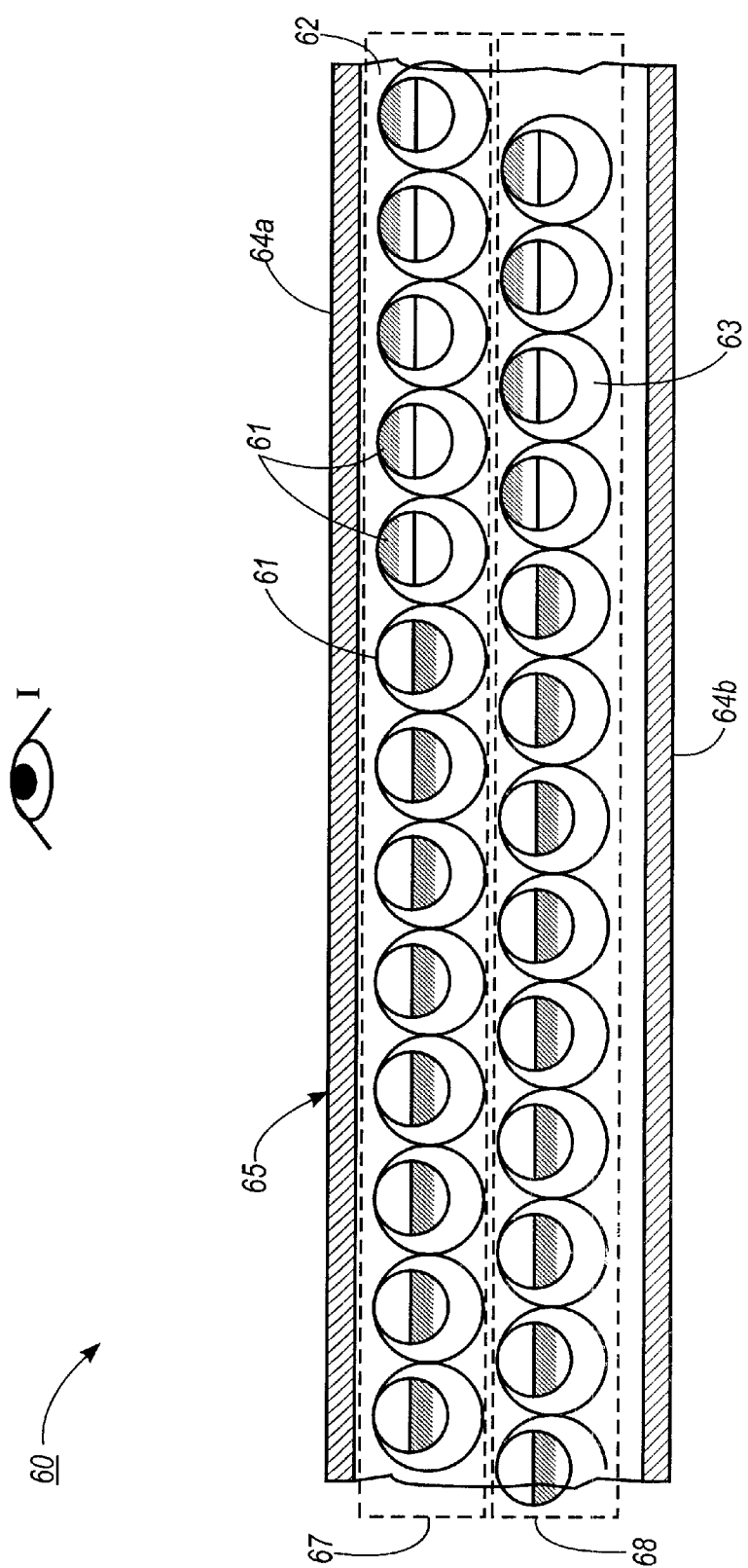
FIG. 6 is a side view of a gyricon display of the present invention in an alternative embodiment wherein the bichromal cylinders are arrayed in a multilayer configuration, with relatively large cavity size.

FIG. 6 shows a side view of a gyricon display 60 of the invention in an alternative embodiment. In display 60, bichromal cylinders 61 are in a top layer 67 and additional lower layers (here represented by second layer 68). Elastomer substrate 62 is swelled by a dielectric fluid (not shown) creating cavities 63 in which the cylinders 61 are free to rotate. Cylinders 61 are electrically dipolar in the presence of the dielectric fluid and so are subject to rotation upon application of an electric field, as by matrix-addressable electrodes 64a, 64b. The electrode 64a closest to upper surface 65 is preferably transparent. An observer at I sees an image formed by the black and white pattern of the cylinders 61 as rotated to expose their black or white faces to the upper surface 65 of substrate 62.

To improve the brightness of display 60 so that it is comparable to the brightness of display 50 (of FIGS. 5A–5B), the top layer 67 can be made close-packed, with packing geometry and reflectance characteristics similar to those of the close-packed monolayer of cylinders 51 in display 50. In this case, cavities 63 are made as small as possible with respect to cylinders 61, and particularly with respect to cylinders in top layer 67, so that these cylinders nearly fill the cavities. Also, cavities 63 are placed as close to one another as possible, so that the cavity walls are as thin as possible. Preferably, cylinders in top layer 67 are of uniform diameter and are situated at a uniform distance from upper surface 65. It will be appreciated that if top layer 67 is close-packed, almost all the light reflected from display 60 so as to be observable to an observer at I is reflected from the white faces of cylinders in top layer 67. At least for top layer 67, the arrangement of cylinders 61 and cavities 63 in display 60 minimizes both the center-to-center spacing and the surface-to-surface spacing between neighboring bichromal cylinders. Cylinders in the lower layers (such as layer 68) can also be close-packed in order to reduce overall display thickness.

In general, a monolayer display, such as display 50 of FIGS. 5A–5B, is preferable to a thicker display, such as display 60 of FIG. 6. This is because a thinner display can operate with a lower drive voltage, which affords concomittant advantages such as reduced power consumption, improved user safety, and the possibility of less expensive drive electronics. Further, a thinner display can offer better resolution than a thicker one, due to reduced fringing fields between adjacent black and white pixels. A thicker display offers fringing fields a greater volume in which to develop, and bichromal cylinders caught in the fringing fields are partially but not fully rotated so that they present a mix of black and white to the observer. Consequently, the display appears gray in the fringing field regions. The thin display has minimal fringing fields, and so provides a sharp demarcation between adjacent black and white pixels. (A more detailed discussion of fringing fields in thick and thin gyricon displays, and the effects of these fields on display resolution, is given in Ser. No. 08/713,935 with reference to FIG. 14 and the accompanying text therein.)

Although it is preferred to align the cylinders end-to-end and side-to-side within the monolayer (or top layer) of the display, so as to form a rectangular array, in alternative embodiments other arrangements of cylinders within the layer can be used. Some examples are seen in FIGS. 7–8.

Figure 7:
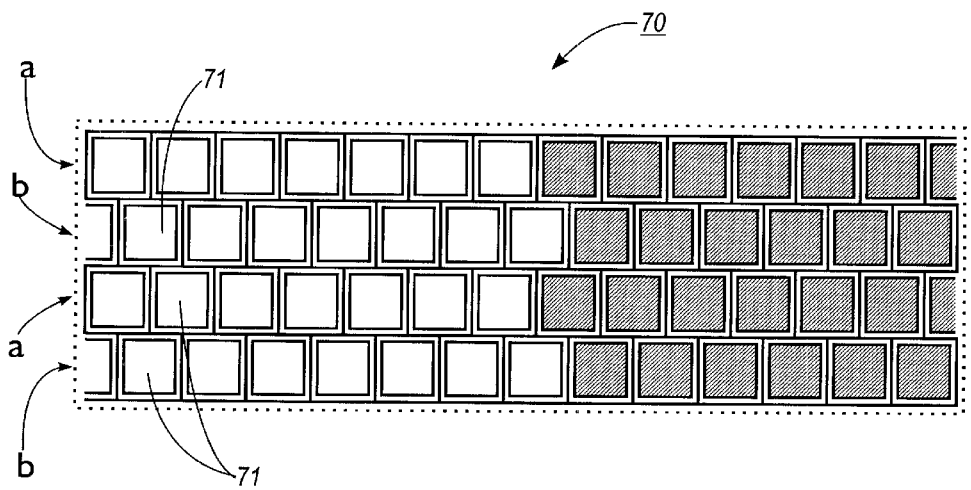
FIGS. 7–8 illustrate top views of gyricon displays of the present invention in alternative embodiments in which the cylinders are, respectively, staggered in their alignment or randomly oriented.

FIG. 7 illustrates a top view of gyricon display 70 of the present invention in an alternative embodiment in which neighboring rows a, b of cylinders 71 are staggered with respect to one another. That is, the cylinders in rows a are aligned end-to-end with each other, as are the cylinders in alternate rows b, but the cylinders in rows a are not aligned side-to-side with those in rows b. The arrangement of FIG. 7 covers the plane as completely as the arrangement of FIG. 5B; however, the arrangement of FIG. 5B can be preferable, because this arrangement produces a well-defined rectangular array of pixels for pixels as small as a single cylinder.

Figure 8:
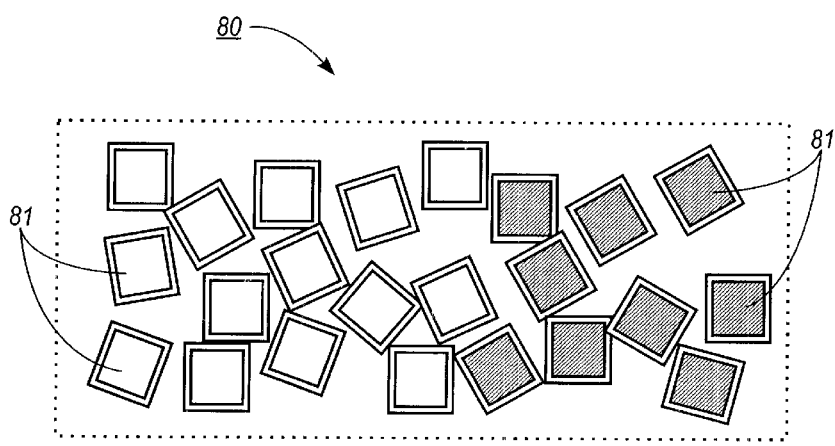

FIG. 8 illustrates a top view of gyricon display 80 of the present invention in an alternative embodiments in which cylinders 81 are in random orientations with respect to one another. That is, the longitudinal axes of cylinders 81 are not parallel to one another. This arrangement of cylinders covers the plane less completely than the arrangements shown in FIG. 5B and FIG. 7, and so is less preferable from the standpoint of maximizing display reflectance.

Figure 9:
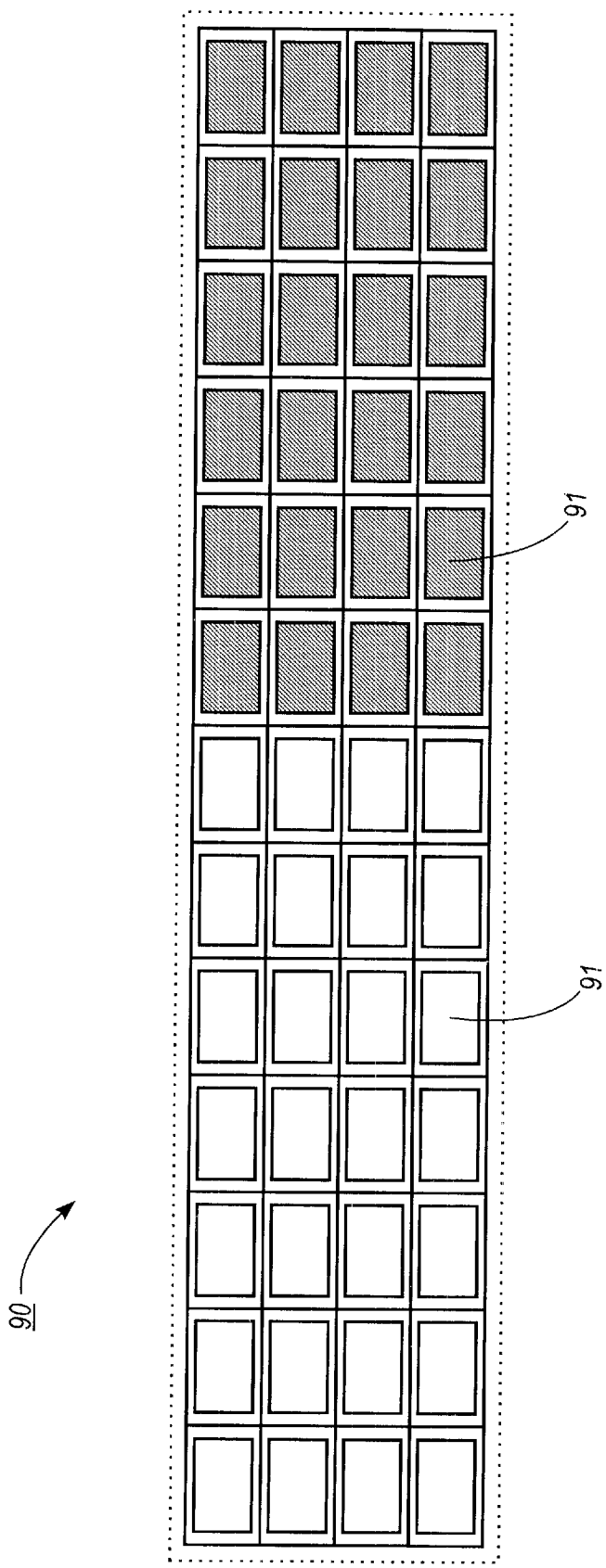
FIG. 9 illustrates a top views of gyricon display of the present invention in an alternative embodiment in which the cylinder aspect ratio is greater than 1:1.

FIG. 9 illustrates a top views of gyricon display 90 of the present invention in an alternative embodiment in which the aspect ratio of the cylinders 91 is greater than 1:1. This alternative embodiment covers the plane comparably with the arrangements of FIG. 5B and FIG. 7. It can be useful, for example, in situations where different display resolutions are desired in the x- and y-dimensions (e.g., a display having a resolution of 1200 by 300 dots per inch).

Up to this point, the discussion of gyricon displays utilizing cylinders instead of spheres has focussed on applications originally utilizing bichromal spheres and how to achieve an enhancement in brightness by using bichromal cylinders. However, gyricon displays utilizing polychromal segmented balls are also known. These displays are fully discussed in U.S. patent application Ser. No. 08/572,779, entitled "POLYCHROMAL SEGMENTED BALLS FOR A TWISTING BALL DISPLAY"; U.S. patent application Ser. No. 08/572,778, entitled "APPLICATIONS OF A TRANSMISSIVE TWISTING BALL DISPLAY"; U.S. patent application Ser. No. 08/572,819, entitled "CANTED ELECTRIC FIELDS FOR ADDRESSING A TWISTING BALL DISPLAY"; U.S. patent application Ser. No. 08/572,927, entitled "HIGHLIGHT COLOR TWISTING BALL DISPLAY"; U.S. patent application Ser. No. 08/572,912, entitled "PSEUDO-FOUR COLOR TWISTING BALL DISPLAY"; U.S. patent application Ser. No. 08/572,820, entitled "ADDITIVE COLOR TRANSMISSIVE TWISTING BALL DISPLAY"; U.S. patent application Ser. No. 08/572,780, entitled "SUBTRACTIVE COLOR TWISTING BALL DISPLAY"U.S. patent application Ser. No. 08/572,775, entitled "MULTITHRESHOLD ADDRESSING OF A TWISTING BALL DISPLAY"; U.S. patent application Ser. No. 08/572,777, entitled "FABRICATION OF A TWISTING BALL DISPLAY HAVING TWO OR MORE DIFFERENT KINDS OF BALLS"and U.S. patent application Ser. No. 08/573,922 entitled "ADDITIVE COLOR TRISTATE LIGHT VALVE TWISTING BALL DISPLAY." All filed concurrently on Dec. 15$^{th}$, 1995 as well as two divisional applications from U.S. patent application Ser. No. 08/572,779, entitled "POLYCHROMAL SEGMENTED BALLS FOR A TWISTING BALL DISPLAY", "POLYCHROMAL SEGMENTED BALLS FOR A TWISTING BALL DISPLAY" now U.S. Pat. No. 5,919,409, U.S. patent application Ser. No. 08/889,762, entitled "APPARATUS FOR FABRICATING POLYCHROMAL SEGMENTED BALLS FOR A TWISTING BALL DISPLAY" filed on Jul. 10$^{th}$, 1997. These applications have been incorporated by reference above.

A corresponding desirable increased display quality can be achieved for these embodiments of gyricon displays as well if the polychromal balls were replaced by polychromal cylinders.

Figure 13A:
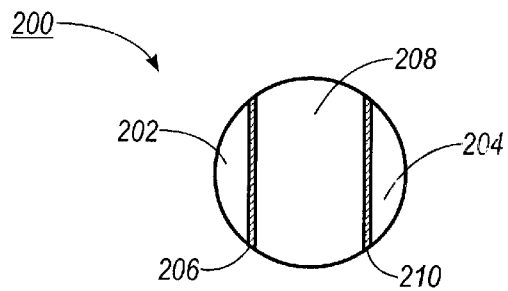
FIG. 13A illustrates a polychromal sphere with three display states.

For example, a highlight color gyricon display is described which uses a polychromal ball 200 as shown in FIG. 13A. The polychromal ball 200 has 5 portions. Two end segments 202, 204 are made of a clear material, while the remaining segments 206, 208, 210 are made from opaque material. The broad central segment 208 may be made white while slice 206 is colored black and slice 210 is chosen to be any other desired color, for instance red as a highlight color. The polychromal ball 200 may be rotated to show either black, from segment 206, white from segment 208 or the highlight color from segment 210.

Figure 13B:
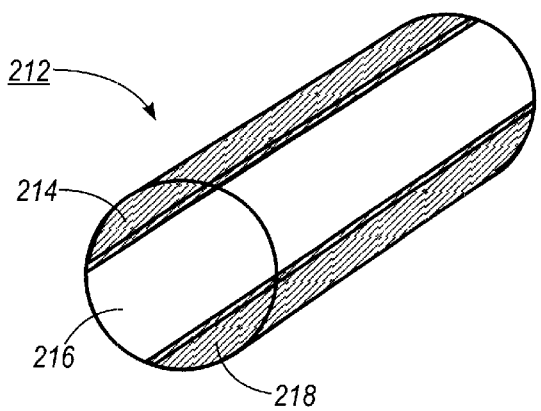
FIG. 13B illustrates a polychromal cylinder with three display states.

A highlight color display using cylinders can be assembled using the techniques described above and using a plurality of cylinders as shown in FIG. 13B. FIG. 13B shows a cylinder 212 with three portions, two cylinder segments 214, 218 and a central cylinder slice 216. A cylinder segment is defined as that portion of the cylinder enclosed when the cylinder surface subtended by a plane. A cylinder slice is defined as that portion of a cylinder enclosed when a cylinder is cut by two substantially parallel planes. If cylinder segment 214 is made black, cylinder slice 216 is made white, and cylinder segment 218 is made to be any other color, for example red as a highlight color, then the resulting gyricon display will operate in exactly the same manner as one made from the sphere shown in FIG. 13A except that it will have a corresponding increase in display quality due to better areal coverage obtainable by cylinders over spheres.

The resulting product would be configured in any of FIGS. 5 through 9 or FIG. 12 With the substitution of cylinder 212 for cylinder elements 51, 61, 71, 81, 91 or 1201 shown therein. The resulting sheet can be used in any application that previously used a gyricon sheet constructed using the polychromal ball shown in FIG. 13A.

Figure 13C:
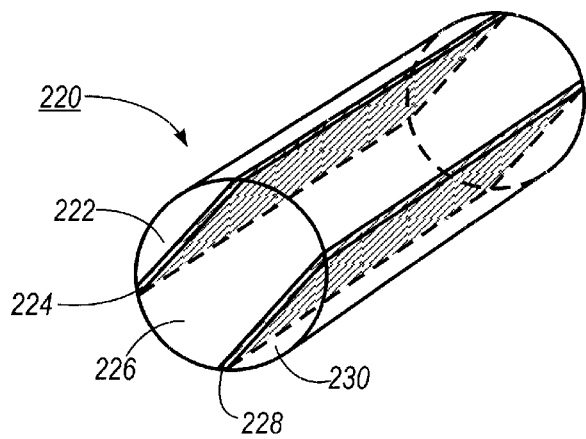
FIG. 13C illustrates an alternative embodiment of a polychromal cylinder with three display states.

An alternative highlight color display using cylinders can be assembled using the techniques described above and using a plurality of cylinders as shown in FIG. 13C. The cylinder 220 (FIG. 13C) should provide an increase in display quality over the cylinder 212 (FIG. 13B) when used in a gyricon system, and is therefore the preferred cylinder for use in this type of gyricon system. FIG. 13C shows a cylinder 220 with five portions, 2 cylinder segments 222, 230 and three cylinder slices 224, 226, 228. If both cylinder segments 222 and 230 are made clear, cylinder slice 226 is made white, cylinder slice 224 is made black and cylinder slice 228 is made to be any other color, for example red as a highlight color, then the resulting gyricon display will operate in exactly the same manner as one made from the sphere shown in FIG. 13A except that it will have a corresponding increase in display quality due to better areal coverage obtainable by cylinders over spheres.

The resulting product would be configured in any of FIGS. 5 through 9 or FIG. 12 With the substitution of cylinder 220 for cylinder elements 51, 61, 71, 81, 91 or 1201 shown therein. The resulting sheet can be used in any application that previously used a gyricon sheet constructed using the polychromal ball shown in FIG. 13A.

An overlay transparency gyricon display is also described which uses a polychromal ball 200 as shown in FIG. 13A. Again the polychromal ball 200 has 5 segments however, both two end segments 202, 204 and the central segment 208 are made of a clear material, while the remaining segments 206, 210 are made from opaque material. Segments 206 and 210 may be chosen to be any desired color, for instance one segment may be red as a highlight color and the other black to provide an underline color, or one segment may be red as a highlight color and the other may be yellow as a second highlight color. The polychromal ball 200 may be rotated to be either transparent from central segment 208, or show either of the two colors from segment 206 or segment 210.

An overlay transparency display using cylinders can be assembled using the techniques described above and using a plurality of cylinders as shown in FIG. 13B. FIG. 13B shows a cylinder 212 with three portions, two cylinder segments 214, 218 and a central cylinder slice 216. If cylinder segment 214 is made one opaque color, cylinder slice 216 is made clear, and cylinder segment 218 is made to be any other color, for example red as a highlight color, then the resulting gyricon display will operate in exactly the same manner as one made from the sphere shown in FIG. 13A except that it will have a corresponding increase in display quality due to better areal coverage obtainable by cylinders over spheres.

The resulting product would be configured in any of FIGS. 5 through 9 or FIG. 12 With the substitution of cylinder 212 for cylinder elements 51, 61, 71, 81, 91 or 1201 shown therein. The resulting sheet can be used in any application that previously used a gyricon sheet constructed using the polychromal ball shown in FIG. 13A.

An alternative overlay transparency gyricon using cylinders can be assembled using the techniques described above and using a plurality of cylinders as shown in FIG. 13C. The cylinder 220 (FIG. 13C) should provide an increase in display quality over the cylinder 212 (FIG. 13B) when used in a gyricon system, and is therefore the preferred cylinder for use in this type of gyricon system. FIG. 13C shows a cylinder 220 with five portions, 2 cylinder segments 222, 230 and three cylinder slices 224, 226, 228. If both cylinder segments 222 and 230 and cylinder slice 226 are made clear, cylinder slice 224 is made any one color and cylinder slice 228 is made to be any other color, for example red as a highlight color, then the resulting gyricon display will operate in exactly the same manner as one made from the sphere shown in FIG. 13A except that it will have a corresponding increase in display quality due to better areal coverage obtainable by cylinders over spheres.

The resulting product would be configured in any of FIGS. 5 through 9 or FIG. 12 With the substitution of cylinder 220 for cylinder elements 51, 61, 71, 81, 91 or 1201 shown therein. The resulting sheet can be used in any application that previously used a gyricon sheet constructed using the polychromal ball shown in FIG. 13A.

Figure 14A:
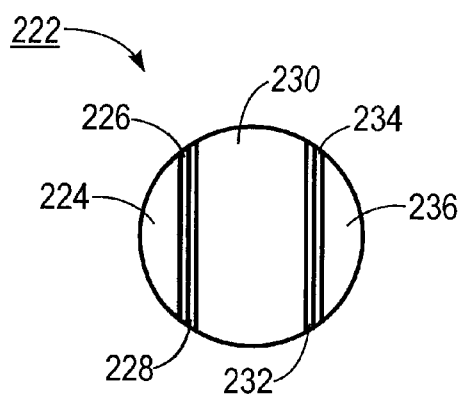
FIG. 14A illustrates a polychromal sphere for use in a pseudo four color gyricon.

A pseudo-four color gyricon is described which uses a polychromal ball 222 as shown in FIG. 14A. The polychromal ball 222 has 7 segments 224, 226, 228, 230, 232, 234, 236. Both two end segments 224, 236 and the central segment 230 are made of a clear material, while the remaining segments 226, 228, 232, 234 are made from opaque material. Segments 226, 228, 232, 234 may be chosen to be any combination of desired colors, for instance segment 226 may be red, segment 228 may be green while segment 232 is yellow and segment 234 is blue. The polychromal ball 222 may be rotated to be either transparent from central segment 230, or to show either of the two colors from segment 226 or segment 234. Additionally, while using a canted field electrode configuration the polychromal ball 222 may be rotated to a position intermediate between its transparent state and opaque states to partially show two colors, either a portion of segment 226 with a portion of segment 232 or a portion of segment 234 with a portion of segment 228. Finally, a background color may be chosen, such as white, which is visible when the polychromal ball is rotated to show transparent segment 230.

Figure 14B:
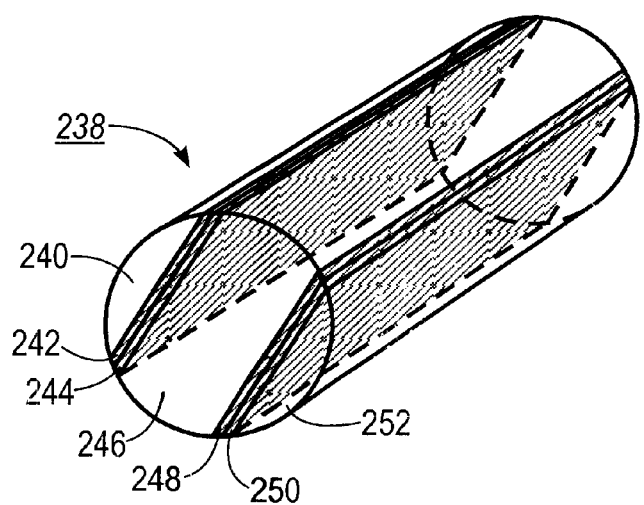
FIG. 14B illustrates a polychromal cylinder for use in a pseudo four color gyricon.

A pseudo-four color gyricon using cylinders can be assembled using the techniques described above and using a plurality of cylinders as shown in FIG. 14B. FIG. 14B shows a cylinder 238 with seven portions, two cylinder segments 240, 252 and five cylinder slices 242, 244, 236, 248, 250. If both cylinder segments 240, 252, and the central cylinder slice 246 are made of clear material, and the remaining cylinder slices 242, 244, 248, 250 are made from a selection of opaque colors, then the resulting gyricon display will operate in exactly the same manner as one made from the sphere shown in FIG. 14A except that it will have a corresponding increase in display quality due to better areal coverage obtainable by cylinders over spheres.

The resulting product would be configured in any of FIGS. 5 through 9 or FIG. 12 with the substitution of cylinder 238 for cylinder elements 51, 61, 71, 81, 91 or 1201 shown therein. The resulting sheet can be used in any application that previously used a gyricon sheet constructed using the polychromal ball 222 shown in FIG. 14A.

Figure 15A:
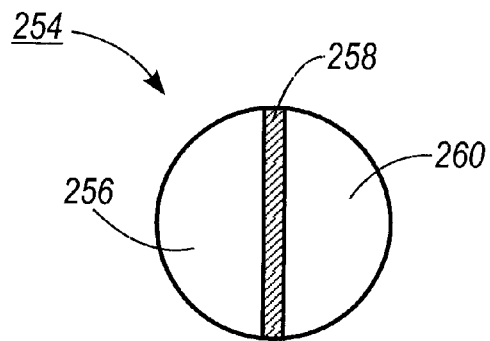
FIG. 15A illustrates a sphere for use in a full color gyricon or as a light valve.

An additive full color RGB gyricon has been described which uses a polychromal ball 254 as shown in FIG. 15A. The polychromal ball 254 has 3 segments 256, 258, 260. Both of the two end segments 256, 260 are made of a clear material, while the remaining thin central segment 258 is made from either clear or opaque colored material. Segment 258 will be either red, blue or green. The polychromal ball 254 may be rotated to be substantially transparent, showing only the thin edge of central segment 258, or rotated to show the fully saturated opaque color of segment 258, or rotated at intermediate values, using a canted field electrode configuration, to show a partially saturated color of segment 258. A pixel of the additive full color RGB gyricon is made up of at least one polychromal ball 254 having a central segment 258 in each of the three colors red, blue, and green. That is the minimal number of polychromal balls 254 needed to make one pixel is three, wherein one ball has a red central segment, one ball has a green central segment and one ball has a blue central segment, although in practice one pixel will contain more than three balls.

Figure 15B:
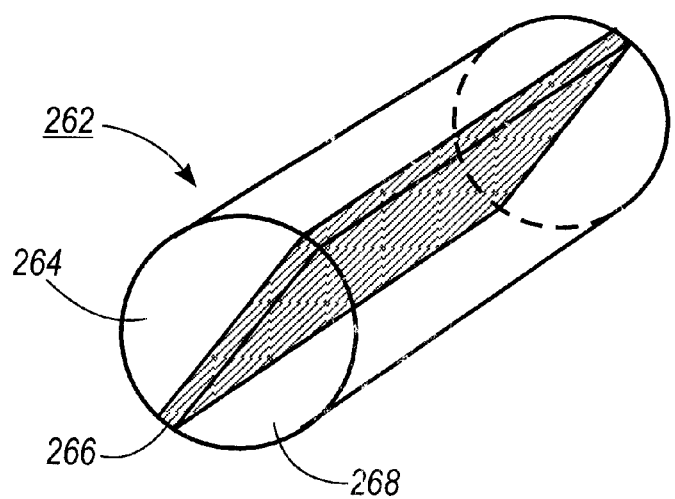
FIG. 15B illustrates a cylinder for use in a full color gyricon device or as a light valve.

An additive full color RGB gyricon using cylinders can be assembled using the techniques described above and using a plurality of cylinders as shown in FIG. 15B. FIG. 15B shows a cylinder 262 with three portions, two cylinder segments 264, 268 and one cylinder slice 266. If both cylinder segments 264, 268 are made of clear material, and the remaining cylinder slice 266 is made from either a clear or opaque color, then the resulting gyricon display will operate in exactly the same manner as one made from the sphere shown in FIG. 15A except that it will have a corresponding increase in display quality due to better areal coverage obtainable by cylinders over spheres.

The resulting product would be configured in any of FIGS. 5 through 9 or FIG. 12 with the substitution of cylinder 262 for cylinder elements 51, 61, 71, 81, 91 or 1201 shown therein. The resulting sheet can be used in any application that previously used a gyricon sheet constructed using the polychromal ball 262 shown in FIG. 15A.

A multi-layer subtractive CMY or CMYK color gyricon has been described which also uses a polychromal ball 254 as shown in FIG. 15A. Again, both of the two end segments 256, 260 are made of a clear material, but the remaining thin central segment 258 is made from clear colored material. Segment 258 will be either cyan, magenta, yellow or black. The polychromal ball 254 may be rotated to be substantially transparent, showing only the thin edge of central segment 258, or rotated to show the fully saturated color of segment 258, or rotated at intermediate values, using a canted field electrode configuration, to show a partially saturated color of segment 258. A pixel of the subtractive full color CMY gyricon is made up of at least one polychromal ball 254 having a central segment 258 in each of the three colors cyan, yellow, and magenta. A pixel of the subtractive full color CMYK gyricon is made up of at least one polychromal ball 254 having a central segment 258 in each of the three colors cyan, yellow, and magenta plus black. However, unlike the previously described RGB gyricon the polychromal balls of a single color reside in separate layers superposed on each other. That is, one layer will contain polychromal balls 254 wherein segment 258 is a transparent magenta color, another layer will contain polychromal balls 254 wherein segment 258 is a transparent cyan color, a the third layer will contain polychromal balls 254 wherein segment 258 is a transparent yellow color, and possibly in a fourth layer there will be polychromal balls 254 wherein segment 258 is black. The transparent segments 258 act as color filters. The three layers may be contained within one sheet or each layer may reside in its own sheet, as is known in the art for polychromal spheres. Each layer may be rotated independently of the other layers, that is, it is possible to rotate only the polychromal balls 254 which have the same color segment 258 without affecting the polychromal balls 254 which have different color segments 258. Independent rotation of layers may be accomplished, by either locating each layer independently of the others with a dedicated addressing electrode scheme or by using for each layer elements which have different rotation thresholds and locating all the elements in one layer and using a single addressing electrode scheme.

A subtractive full color CMY or CMYK gyricon using cylinders can be assembled using the techniques described above and using a plurality of cylinders as shown in FIG. 15B. FIG. 15B shows a cylinder 262 with three portions, two cylinder segments 264, 268 and one cylinder slice 266. If both cylinder segments 264, 268 are made of clear material, and the remaining cylinder slice 266 is made from a clear color, then the resulting gyricon display will operate in exactly the same manner as one made from the sphere shown in FIG. 15A except that it will have a corresponding increase in display quality due to better areal coverage obtainable by cylinders over spheres.

The resulting product could be configured such that each layer appears as in any of FIGS. 5 through 9 or FIG. 12 with the substitution of cylinder 262 for cylinder elements 51, 61, 71, 81, 91 or 1201 shown therein. The resulting sheet can be used in any application that previously used a gyricon sheet constructed using the polychromal ball 262 shown in FIG. 15A.

Additive full color RGB gyricons have been described which use polychromal balls as a light valve.

In a first approach, a polychromal ball 254, as shown in FIG. 15A, is used. Both of the two end segments 256, 260 are made of a clear material, while the remaining central segment 258 is made from opaque colored material. The polychromal ball 254 may be rotated to be substantially transparent, showing only the thin edge of central segment 258, or rotated to be completely opaque showing all of segment 258, or rotated at intermediate values, using a canted field electrode configuration, to be partially opaque showing a portion of segment 258. Each polychromal ball 254 is used as a valve to either reveal, obscure, or partially obscure a colored dot situated behind the polychromal ball 254 depending on the orientation of the polychromal ball 254. In a minimum set, the colored dots will be of least three colors (red, blue and green), and a pixel will contain at least one dot of each color and its associated polychromal ball 254 to act as a light valve.

An additive full color RGB gyricon using cylinders as a light valve can be assembled using the techniques described above and using a plurality of cylinders as shown in FIG. 15B. FIG. 15B shows a cylinder 262 with three portions, two cylinder segments 264, 268 and one cylinder slice 266. If both cylinder segments 264, 268 are made of clear material, and the remaining cylinder slice 266 is made from opaque material, then the resulting gyricon display will operate in exactly the same manner as one made from the sphere shown in FIG. 15A except that it will have a corresponding increase in display quality due to better areal coverage obtainable by cylinders over spheres. Due to the better areal coverage obtainable by cylinders, the colored dots to be obscured by the light valve may be replaced with a shape described by the projection of a cylinder rather than a circle (which is the shape projected by a sphere). That shape depends on the shape of the specific cylinders used and may be either a square or a rectangle.

The resulting product would be configured in any of FIGS. 5 through 9 or FIG. 12 with the substitution of cylinder 262 for cylinder elements 51, 61, 71, 81, 91 or 1201 shown therein. The resulting sheet can be used in any application that previously used a gyricon sheet constructed using the polychromal ball 262 shown in FIG. 15A.

Figure 16A:
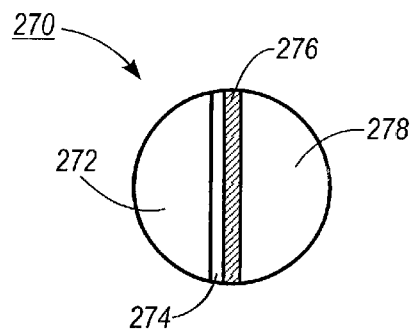
FIG. 16A illustrates an alternative sphere for usein a gyricon device as a light valve.

In a second approach, a polychromal ball 270, as shown in FIG. 16A, is used. Both of the two end segments 272, 278 are made of a clear material, while the two central segments 274, 276 are made from opaque colored material. One central segment 274 is colored black, while the other central segment 276 is colored white. The polychromal ball 270 may be rotated to be substantially transparent, showing only the thin edge of both central segments 274, 276, to be white showing all of segment 274, to be black showing all of segment 276 or rotated at intermediate values, using a canted field electrode configuration, to be partially opaque showing a portion of either segment 274, 276. Each polychromal ball 270 is used as a valve to either reveal, obscure, or partially obscure a colored dot situated behind the polychromal ball 270 depending on the orientation of the polychromal ball 270. In a minimum set, the colored dots will be of least three colors (red, blue and green), and a pixel will contain at least one dot of each color and its associated polychromal ball 270 to act as a light valve.

Figure 16B:
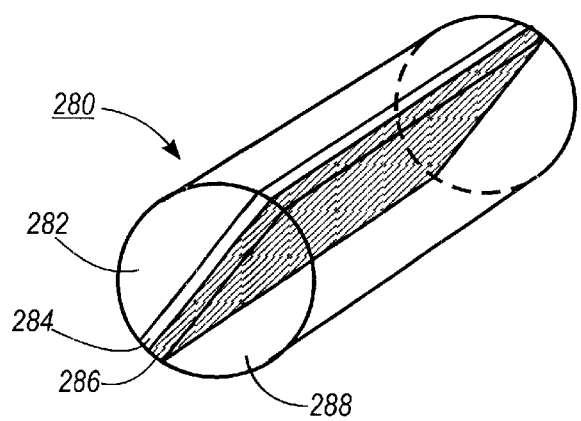
FIG. 16B illustrates an alternative cylinder for use in a gyricon device as a light valve.

An additive full color RGB gyricon using cylinders as a light valve can be assembled using the techniques described above and using a plurality of cylinders as shown in FIG. 16B. FIG. 16B shows a cylinder 280 with three portions, two cylinder segments 282, 288 and two cylinder slices 284, 286. If both cylinder segments 280, 288 are made of clear material, and the two cylinder slices 284, 286 are made from opaque black and white material respectively, then the resulting gyricon display will operate in exactly the same manner as one made from the sphere shown in FIG. 16A except that it will have a corresponding increase in display quality due to better areal coverage obtainable by cylinders over spheres. Due to the better areal coverage obtainable by cylinders, the colored dots to be obscured by the light valve may be replaced with a shape described by the projection of a cylinder rather than a circle (which is the shape projected by a sphere). That shape depends on the shape of the specific cylinders used and may be either a square or a rectangle.

The resulting product would be configured in any of FIGS. 5 through 9 or FIG. 12 with the substitution of cylinder 280 for cylinder elements 51, 61, 71, 81, 91 or 1201 shown therein. The resulting sheet can be used in any application that previously used a gyricon sheet constructed using the polychromal ball 270 shown in FIG. 15A.

Cylinder Fabrication Techniques

Figure 10:
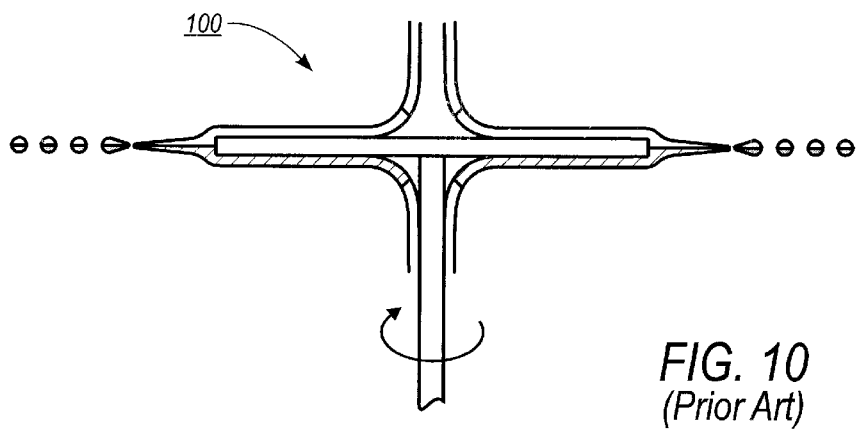
FIG. 10 illustrates a side view of a spinning-disk mechanism for fabrication of bichromal balls in the PRIOR ART.

FIG. 10 (PRIOR ART) illustrates a side view of a spinning-disk mechanism 100 for fabrication of bichromal spherical balls. Mechanism 100 is equivalent to the "spinning disc configuration 50" disclosed in the '098 patent incorporated by reference hereinabove; see FIG. 4 therein and the accompanying description at col. 4, line 25 to col. 5, line 7.

In the prior art, the spinning disk mechanism was used in conjunction with low-viscosity hardenable liquids. Low viscosity was considered necessary to ensure the formation of good-quality bichromal spheres; if viscosity was too high, the ligaments streaming off the disk would freeze in place instead of fragmenting into balls as desired. For example, as stated in the '098 patent (col. 5, line 64–col. 6 line 2), "the black and white pigmented liquids are delivered . . . in a heated, molten state . . . so that they flow freely and do not harden prematurely, i.e., long enough to prevent the ligaments from freezing."

Figure 11:
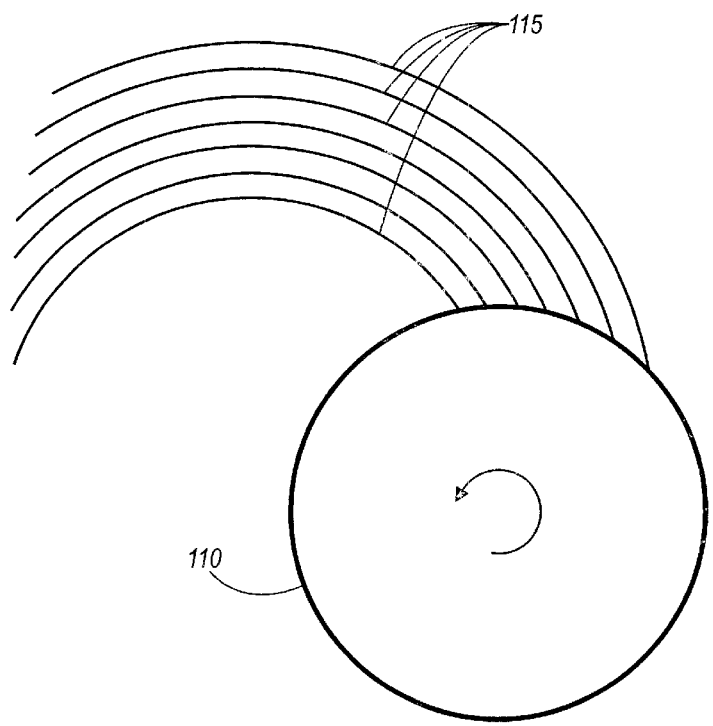
FIG. 11 illustrates a top view of a spinning-disk mechanism for fabrication of bichromal cylinders of the invention.

According to the invention, the spinning disk mechansm is used in conjunction with high-viscosity hardenable liquids. These liquids do, indeed, "freeze" (harden) in place, the very result not desired in the prior art. However, according to the invention the frozen ligaments that are considered undesirable for making bichromal spheres can be used to make bichromal cylinders. FIG. 11 illustrates this. A spinning disk 110, shown here in a top view, is used according to the technique of the '098 patent to form bichromal ligaments, but with high-viscosity hardenable white and black liquids being used in place of the low-viscosity liquids of the prior art. The resulting ligaments 115 harden into fine bichromal filaments (roughly analogous to the way in which molten sugar hardens into filaments when spun in a cotton-candy machine). The filaments can be combed or otherwise aligned and then cut into even lengths, as with a tungsten carbide knife or a laser, to produce the desired bichromal cylinders. End-to-end and side-to-side alignment of the cut cylinders can be achieved by precise alignment of the filament ends on the working surface where the cutting takes place; for example, if the cylinders are to have aspect ratio 1:1 and diameter 100 microns, then the filament ends can be aligned with one another to within a tolerance on the order of 5 to 10 microns.

Figure 17A:
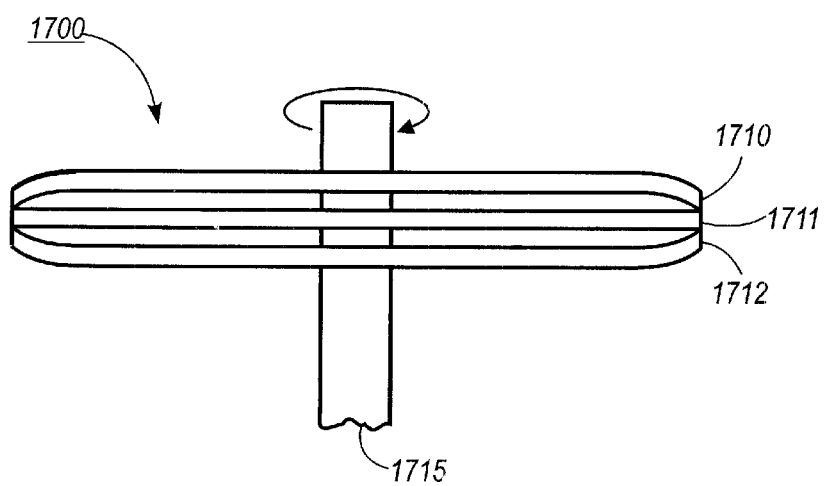
FIG. 17A illustrates a multiple-disk assembly for fabricating multichromal gyricon balls.

In the same manner that a modification of the method used to produce bichromal spheres can be used to produce bichromal cylinders, just so can a modification of the method used to produce polychromal spheres be used to produce polychromal cylinders. A modification of the spinning-disk technique can be used to fabricate multichromal balls. The modification uses a spinning multiple-disk assembly instead of a single spinning disk. An example is illustrated in FIG. 17A. Assembly 1700 has three disks 1710, 1711, 1712 that rotate uniformly about shaft 1715. The concave or "dish-shaped" outer disks 1710, 1712 curve or slope toward the flat inner disk 1711 at their respective peripheries. Other geometries are possible, and the exact geometry for a particular embodiment can be determined, for example, by hydrodynamic modeling, as will be appreciated by those of skill in the art.

The three-disk assembly of FIG. 17A can be used to produce multichromal balls and cylinders having certain useful properties, as will be discussed below. It will be appreciated, however, that other assemblies having different numbers of disks can also be used in the present invention, with the number and configuration of the disks varying according to the kind of ball that is to be produced.

Figure 17B:
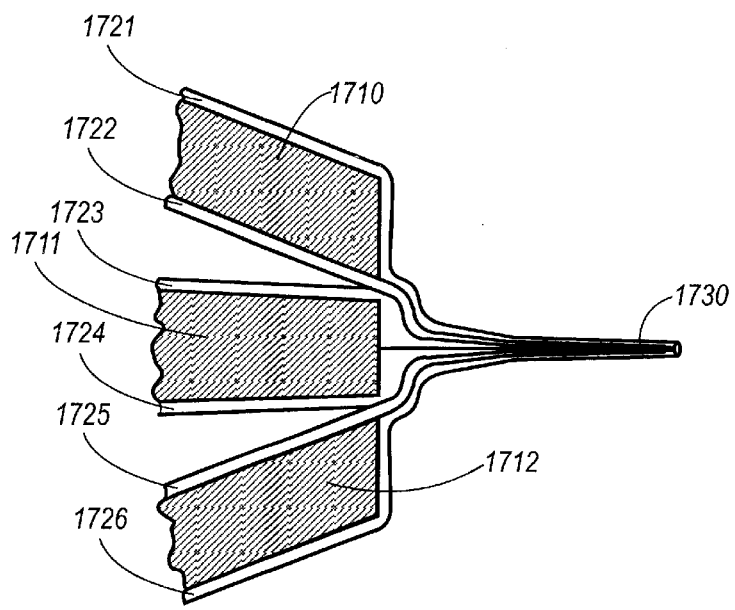
FIG. 17B illustrates a portion of the multiple-disk assembly shown in FIG. 17A.
Figure 17C:
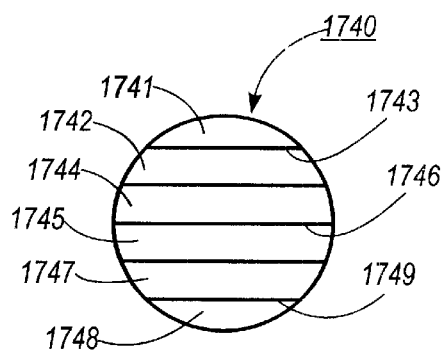
FIG. 17C illustrates a side view of multichromal gyricon ball made using the disk assembly shown in FIGS. 17A–B.
Figure 17D:
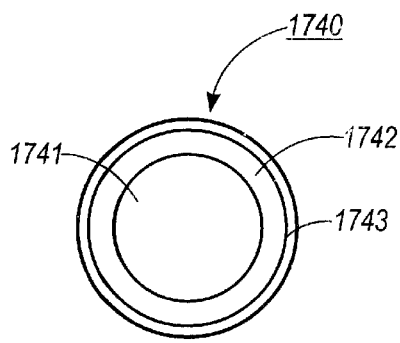
FIG. 17D illustrates a top view of multichromal gyricon ball made using the disk assembly shown in FIGS. 17A–B

If differently pigmented low viscosity hardenable plastic liquids are introduced to each side of each of the three disks 1710, 1711, 1712 in FIG. 17A, flow patterns of pigmented liquids at the edge of the disks can be obtained that result in multichromal ligaments that break up to form multichromal balls. FIG. 17B illustrates a close-up cross-sectional view of an example of the flow of pigmented plastic liquids at the edge of the three-disk assembly of FIG. 17A. First and second liquids 1721, 1722 flow over opposite sides of disk 1710, whose downward-sloping edge can be seen in the figure. Third and fourth liquids 1723, 1724 flow over opposite sides of disk 1711, and fifth and sixth liquids 1725, 1726 flow over opposite sides of disk 1712. The combined flows give rise to ligament 1730, which breaks up into multilayer balls such as the ball 1740 illustrated in FIG. 17C (side view) and FIG. 17D (top view).

Ball 1740 has six segments corresponding to the six streams of plastic liquid used to make it. Segments 1741 and 1742 join at planar interface 1743; segments 1744 and 1745, at planar interface 1746; and segments 1747 and 1748, at planar interface 1749. If different pigments are used in the various plastic liquids 1721, 1722, 1723, 1724, 1725, 1726, then ball 1740 will be multichromal. In general, a three-disk assembly like the one shown in FIG. 17A can produce gyricon balls having six segments of up to six different colors.

More generally, a multi-disk assembly with N disks can be used to produce gyricon balls having up to 2N segments in arbitrary color combinations. Black, white, or other color pigments or dyes can be used, alone or in combination, so that segments can be made in virtually any desired color or shade. Segments can be made clear by using unpigmented, undyed plastic liquid. Different segments can be made to have different widths by adjusting the flow rates of the various plastic liquids used to make the segments, with faster flow rates corresponding to wider segments and slower rates to narrower. Two or more adjacent segments can be made the same color so that they effectively merge to form a single broader segment.

Figure 18:
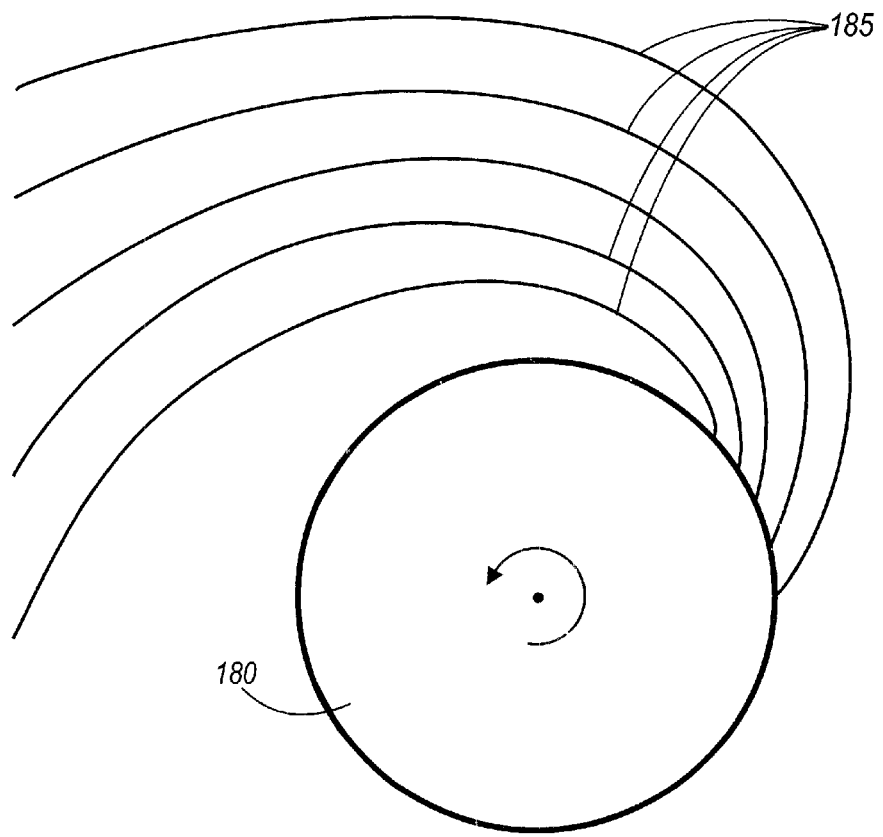
FIG. 18 illustrates a top view of a spinning-disk mechanism for fabrication of polychromal cylinders of the invention.

As discussed earlier and shown in FIG. 11, when the spinning disk mechansm is used in conjunction with high-viscosity hardenable liquids these liquids do, indeed, "freeze" (harden) in place to create ligaments that can be used to make polychromal cylinders. FIG. 18 illustrates this for the case of a multiple disk system. When a spinning disk assembly 180, shown here in a top view, is used according to the technique of the '098 patent to form bichromal ligaments, but with high-viscosity hardenable liquids being used in place of the low-viscosity liquids of the prior art the resulting ligaments 185 harden into fine bichromal filaments (roughly analogous to the way in which molten sugar hardens into filaments when spun in a cotton-candy machine). The filaments can be combed or otherwise aligned and then cut into even lengths, as with a tungsten carbide knife or a laser, to produce the desired bichromal cylinders. End-to-end and side-to-side alignment of the cut cylinders can be achieved by precise alignment of the filament ends on the working surface where the cutting takes place; for example, if the cylinders are to have aspect ratio 1:1 and diameter 100 microns, then the filament ends can be aligned with one another to within a tolerance on the order of 5 to 10 microns.

By way of example, any given gyricon cylinder segment can be: black; white; clear (that is, essentially transparent and without chroma, like water or ordinary window glass); a transparent color (e.g., transparent red, blue, or green, as for certain additive color applications; transparent cyan, magenta, or yellow, as for certain subtractive color applications); an opaque color of any hue, saturation, and luminance; any shade of gray, whether opaque or translucent; and so forth. Any given gyricon cylinder segment can also have other optical properties polarization, birefringence, phase retardation, light absorption, light scattering, and light reflection. For ease of reference, "achromatic colors" will be used herein below to refer to colors essentially lacking in chroma, that is, to black, white, gray, and clear, and "chromatic colors" will be used hereinbelow to refer to other colors, including red, orange, yellow, green, blue, indigo, violet, cyan, magenta, pink, brown, beige, etc.

Alternative techniques can also be used to produce the bichromal cylinders. For example, injection molding can be used, albeit perhaps with some inconvenience. As another example, the bichromal jet technique disclosed in the '594 patent can be used, again substituting high-viscosity hardenable liquids for the usual low-viscosity liquids.

No-Cavities Cylinder Display

In a gyricon display made with swelled elastomer, each bichromal cylinder is situated in a cavity. To achieve the closest possible packing of bichromal cylinders in such a display, the cavities are preferably made as small and as close together as possible.

To achieve still higher packing density, a gyricon display can be constructed without elastomer and without cavities. In such a display, the bichromal cylinders are placed directly in the dielectric fluid. The cylinders and the dielectric fluid are then sandwiched between two retaining members (e.g., between the addressing electrodes). There is no elastomer substrate. In this case, the packing geometry can closely approach, or even achieve, the ideal close-packed monolayer geometry shown in FIG. 4.

Figure 12:
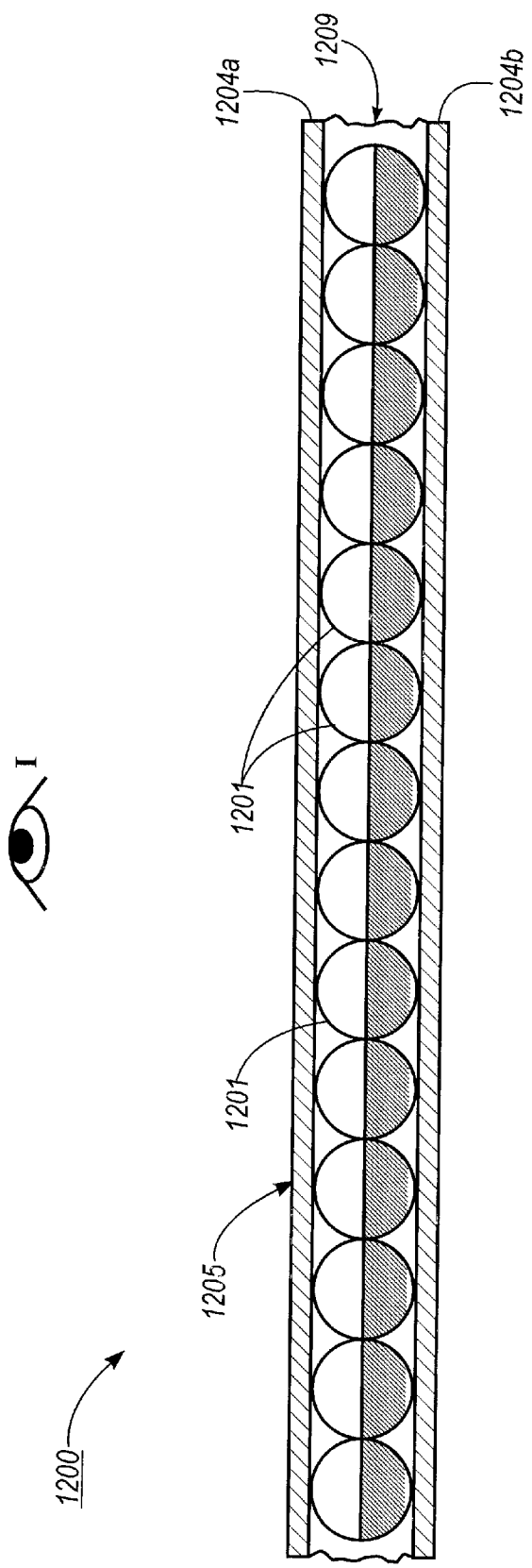
FIG. 12 illustrates an alternative embodiment of the gyricon display of the invention wherein there is no elastomer or other cavity-containing substrate to retain the monolayer of cylinders in place.

FIG. 12 illustrates a side view of a no-cavities gyricon display. In display 1200, a monolayer of bichromal cylinders 1201 of uniform diameter is situated in dielectric fluid 1209 between matrix-addressable electrodes 1204a, 1204b. Preferably cylinders 1201 of unit aspect ratio are arranged in a rectangular array, aligned end-to-end and side-to-side within the monolayer and packed as close together as is possible consistent with proper cylinder rotation. Cylinders 1201 are electrically dipolar in the presence of dielectric fluid 1209 and so are subject to rotation upon application of an electric field, as by electrodes 1204a, 1204b. The electrode 1204a closest to upper surface 1205 is preferably transparent. An observer at I sees an image formed by the black and white pattern of the cylinders 1201 as rotated to expose their black or white faces to the upper surface 1205 of display 1200.

Electrodes 1204a, 1204b serve both to address cylinders 1201 and to retain cylinders 1201 and fluid 1209 in place. Preferably the spacing between electrodes 1204a, 1204b is as close to the diameter of cylinders 1201 as is possible consistent with proper cylinder rotation. Cylinders 1201 and fluid 1209 can be sealed in display 1200, for example by seals at either end of the display (not shown). The close packing of cylinders 1201 in the monolayer, together with the close spacing of the electrodes 1204a, 1204b, ensures that cylinders 1201 do not settle, migrate, or otherwise escape from their respective positions in the monolayer.

It should be pointed out that the no cavities cylinder display is not limited to the bichromal cylinders 1201 shown in FIG. 12, but in fact any of the cylinders described herein may be used to construct the no cavities cylinder display.

CONCLUSION

A new gyricon display based on cylindrical elements instead of spherical elements has been described. This new display makes possible a close-packed monolayer providing nearly 100 percent areal coverage. Such a display provides superior reflectance and brightness, and requires no interstitial particles.

The foregoing specific embodiments represent just some of the possibilities for practicing the present invention.

Many other embodiments are possible within the spirit of the invention. For example:

The electrical anisotropy of a gyricon cylinder need not be based on zeta potential. It is sufficient that there is an electrical dipole moment associated with the cylinder, the dipole moment being oriented with respect to the long axis of the cylinder in such a way as to facilitate a useful rotation of the cylinder in the presence of an applied external electric field. (Typically, the dipole moment is oriented along a medial axis of the cylinder.) Further, it should be noted that a gyricon cylinder can have an electrical monopole moment in addition to its electrical dipole moment, as for example when the dipole moment arises from a separation of two positive charges of different magnitudes, the resulting charge distribution being equivalent to a positive electrical monopole superposed with an electrical dipole.

The optical anisotropy of a gyricon cylinder need not be based on black and white. For example, bichromal cylinders having hemispheres of two different colors, e.g. red and blue, can be used. As another example, cylinders that are black in one hemisphere and mirrored in the other might be used for some applications. In general, various optical properties can vary as different aspects of a gyricon cylinder are presented to an observer, including (but not limited to) light scattering and light reflection in one or more regions of the spectrum. Thus the gyricon cylinders can be used to modulate light in a wide variety of ways.

The incident light that encounters a gyricon display need not be restricted to visible light. Given suitable materials for the gyricon cylinders, the incident "light" can be, for example, infrared light or ultraviolet light, and such light can be modulated by the gyricon display.

On several occasions the foregoing description refers to a planar monolayer of bichromal cylinders. However, persons of skill in the art will appreciate that a gyricon display (or a sheet of bichromal cylinders for use in such a display) made of a flexible material can be temporarily or permanently deformed (for example, flexed, folded, or rolled) so as not to be strictly planar overall. In such cases, the plane of a monolayer can be defined, for example, in a locally planar neighborhood that includes the gyricon cylinder or cylinders of interest. Also, it will further be appreciated that in practice the monolayer can vary somewhat from what has been described, for example, due to manufacturing tolerances or slight imperfections of particular gyricon sheets.

Accordingly, the scope of the invention is not limited to the foregoing specification, but instead is given by the appended claims together with their full range of equivalents.

What is claimed is:

1. A display particle comprising:
a substantially cylindrical optically anisotropic particle comprised of two cylinder segments and at least one cylinder slice interposed therebetween, wherein each cylinder segment is joined by a substantially planar interface to one of the at least one cylinder slices, the substantially planar interface being substantially parallel to the longitudinal axis of the particle; wherein the particle has an anisotropy for providing an electrical dipole moment, the electrical dipole moment rendering the particle electrically responsive such that when the particle is rotatably disposed in an electric field while the electrical dipole moment is provided, the particle tends to rotate to an orientation in which the electrical dipole moment aligns with the electric field, and wherein the rotatable disposition achievable for each particle is a rotatable disposition that facilitates rotation about the longitudinal axis of the particle.

2. The display particle of claim 1 wherein at least one component region is opaque.

3. The display particle of claim 1 wherein at least one component region is transparent.

4. The display particle of claim 2 wherein the cylinder segments are opaque.

5. The display particle of claim 1 wherein the cylinder segments are transparent.

6. A display particle comprising:

a substantially cylindrical optically anisotropic particle comprised of two cylinder segments and a multiplicity of cylinder slices interposed therebetween, wherein each cylinder segment is joined by a substantially planar interface to one of the multiplicity of cylinder slices and each cylinder slice is joined to at least one other slice by a substantially planar interface, wherein all of the substantially planar interfaces are substantially parallel to the longitudinal axis of the particle, wherein the particle has an anisotropy for providing an electrical dipole moment, the electrical dipole moment rendering the particle electrically responsive such that when the particle is rotatably disposed in an electric field while the electrical dipole moment is provided, the particle tends to rotate to an orientation in which the electrical dipole moment aligns with the electric field, and wherein the rotatable disposition achievable for each particle is a rotatable disposition that facilitates rotation about the longitudinal axis of the particle.

7. The display particle of claim 6 wherein at least one component region is opaque.

8. The display particle of claim 6 wherein at least one component region is transparent.

9. The display particle of claim 6 wherein the cylinder segments are opaque.

10. The display particle of claim 6 wherein the cylinder segments are transparent.

* * * * *